United States Patent
Hernandez et al.

(10) Patent No.: US 7,197,092 B2
(45) Date of Patent: Mar. 27, 2007

(54) AMPLITUDE-OFFSET INVARIANT TEMPLATE DETECTION FOR PULSE POSITION ESTIMATION; METHODS, SYSTEMS AND PROGRAM PRODUCTS

(75) Inventors: David Hernandez, Smithtown, NY (US); David Goren, Smithtown, NY (US)

(73) Assignee: Symbol Technologies Inc., Holtsville, NY (US)

( * ) Notice: Subject to any disclaimer, the term of this patent is extended or adjusted under 35 U.S.C. 154(b) by 720 days.

(21) Appl. No.: 10/242,363

(22) Filed: Sep. 13, 2002

(65) Prior Publication Data

US 2003/0086489 A1    May 8, 2003

Related U.S. Application Data

(60) Provisional application No. 60/346,713, filed on Oct. 25, 2001.

(51) Int. Cl.
*H03D 1/00* (2006.01)
(52) U.S. Cl. .................. 375/340; 375/343
(58) Field of Classification Search .......... 375/239, 375/316, 320, 362, 340, 343, 364, 354, 130, 375/140, 141, 142, 346–349, 147, 150, 268, 375/259, 144, 148; 455/39, 500, 501, 504, 455/506, 296, 130, 65, 62
See application file for complete search history.

(56) References Cited

U.S. PATENT DOCUMENTS

| | | | | |
|---|---|---|---|---|
| 4,672,638 A | * | 6/1987 | Taguchi et al. | 375/346 |
| 4,989,219 A | * | 1/1991 | Gerdes et al. | 375/286 |
| 5,568,513 A | | 10/1996 | Croft et al. | 375/224 |
| 5,701,329 A | | 12/1997 | Croft et al. | 375/224 |
| 5,740,200 A | | 4/1998 | Kamata | 375/224 |
| 5,910,905 A | | 6/1999 | Quian et al. | 364/724.08 |
| 6,233,273 B1 | | 5/2001 | Webster et al. | 375/148 |
| 6,342,854 B1 | | 1/2002 | Deffett-Smith et al. | 342/457 |
| 6,539,213 B1 | * | 3/2003 | Richards et al. | 455/226.3 |
| 6,556,621 B1 | * | 4/2003 | Richards et al. | 375/150 |
| 6,859,506 B1 | * | 2/2005 | McCorkle | 375/346 |
| 6,901,104 B1 | * | 5/2005 | Du et al. | 375/142 |
| 6,937,667 B1 | * | 8/2005 | Fullerton et al. | 375/295 |
| 2002/0064245 A1 | * | 5/2002 | McCorkle | 375/346 |
| 2003/0174048 A1 | * | 9/2003 | McCorkle | 340/10.34 |
| 2005/0129153 A1 | * | 6/2005 | McCorkle | 375/346 |

OTHER PUBLICATIONS

Win et al., "Impulse Radio: How it Works", IEEE Communications Letters, vol. 2, No. 2, Feb. 1998, pp. 36-38.*

(Continued)

*Primary Examiner*—Tesfaldet Bocure
*Assistant Examiner*—Vineeta Panwalkar
(74) *Attorney, Agent, or Firm*—Baker Botts LLP

(57) ABSTRACT

A method and system of determining and correcting modulation and offset effects in a received signal. A signal [s(n)] is received subject to modulation effects A on pulse shape or peak [p(n)] and vertical offset B due to multipath where "n" is a pulse rate or samples of the signal. A template of length N incorporates a replica of the original signal [s(n)] without multipath or vertical offset. The template is normalized and generates either an extended template or a balanced template. The extended template is correlated with the received signal [s(n)] by shifting the extended template along the received signal to estimate modulation effects of A at a particular time, n. The average difference between the template and the modulated signal [p(n)] is calculated to determine the magnitude of the offset B for a particular time, n.

13 Claims, 15 Drawing Sheets

OTHER PUBLICATIONS

Suzuki et al., "Statistical Characteristics of Indoor Multipath Propagation Predicted by Ray Tracing Simulation", Bulletin of the University of Electro-Communications, vol. 8 No. 1 (Serial No. 15) pp. 7-15, Jun. 1995.

Peterson et al., "Spread Spectrum Indoor Geolocation," Journal of The Institute of Navigation, vol. 45, No. 2, Summer 1998.

* cited by examiner

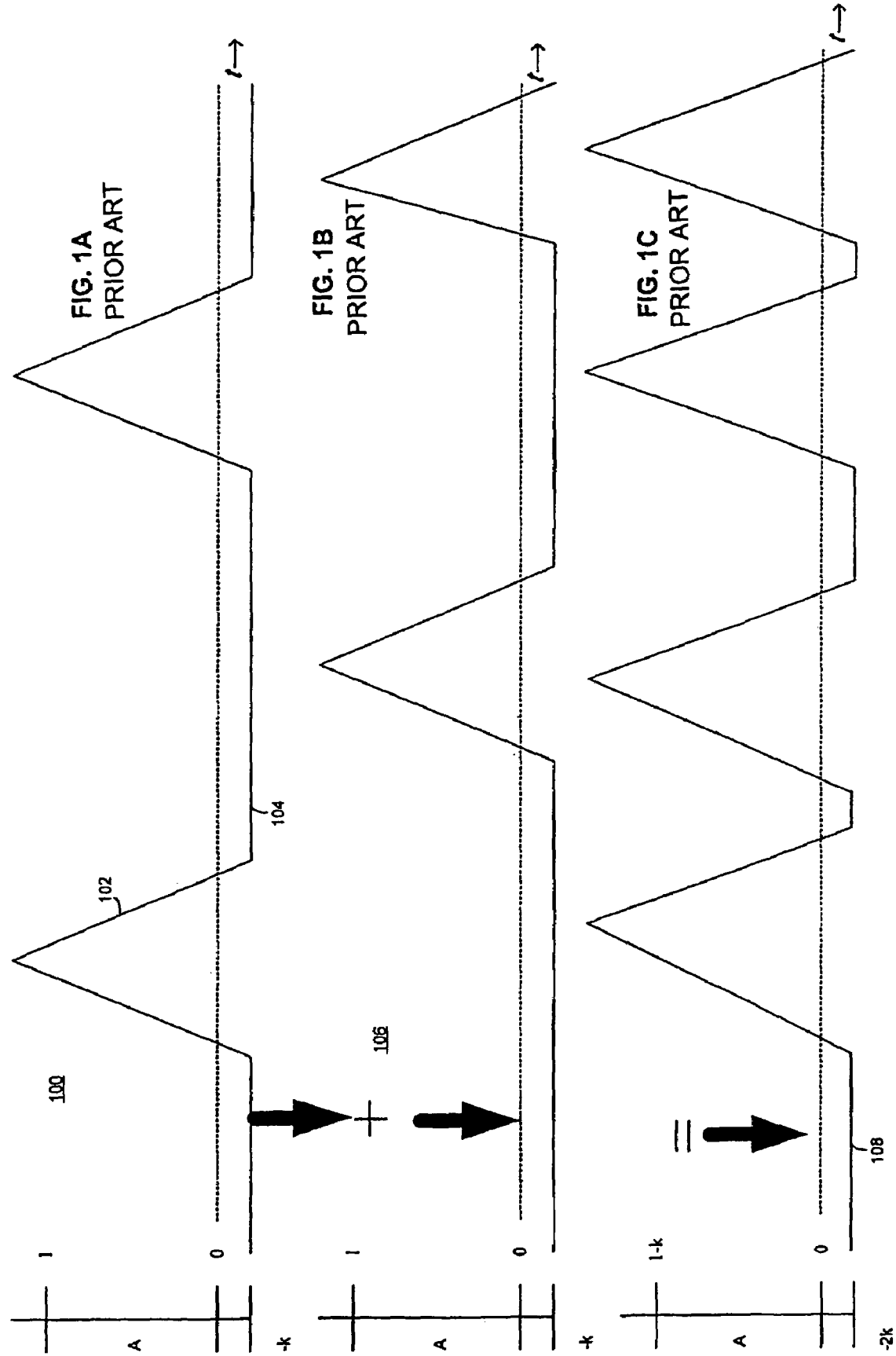

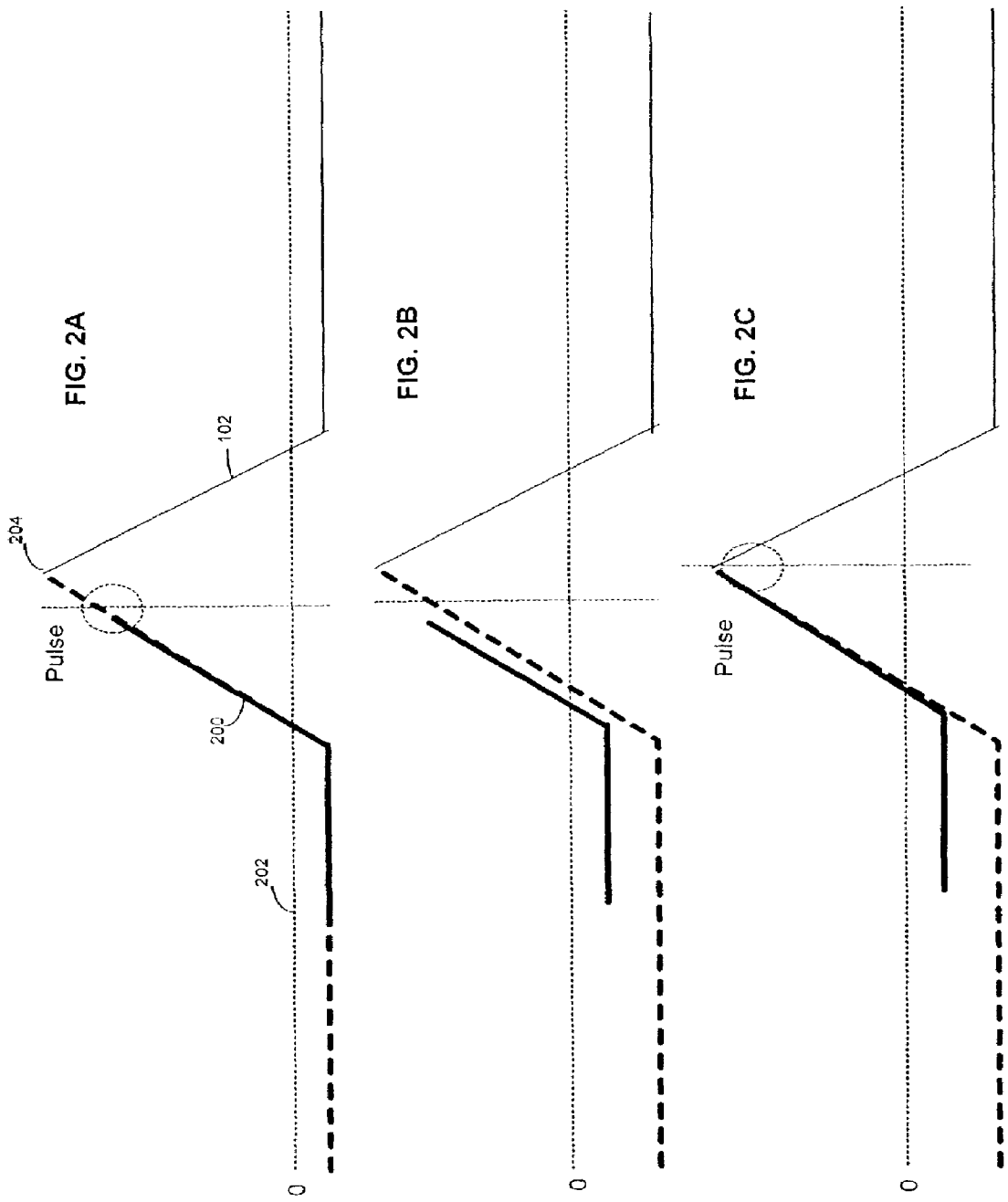

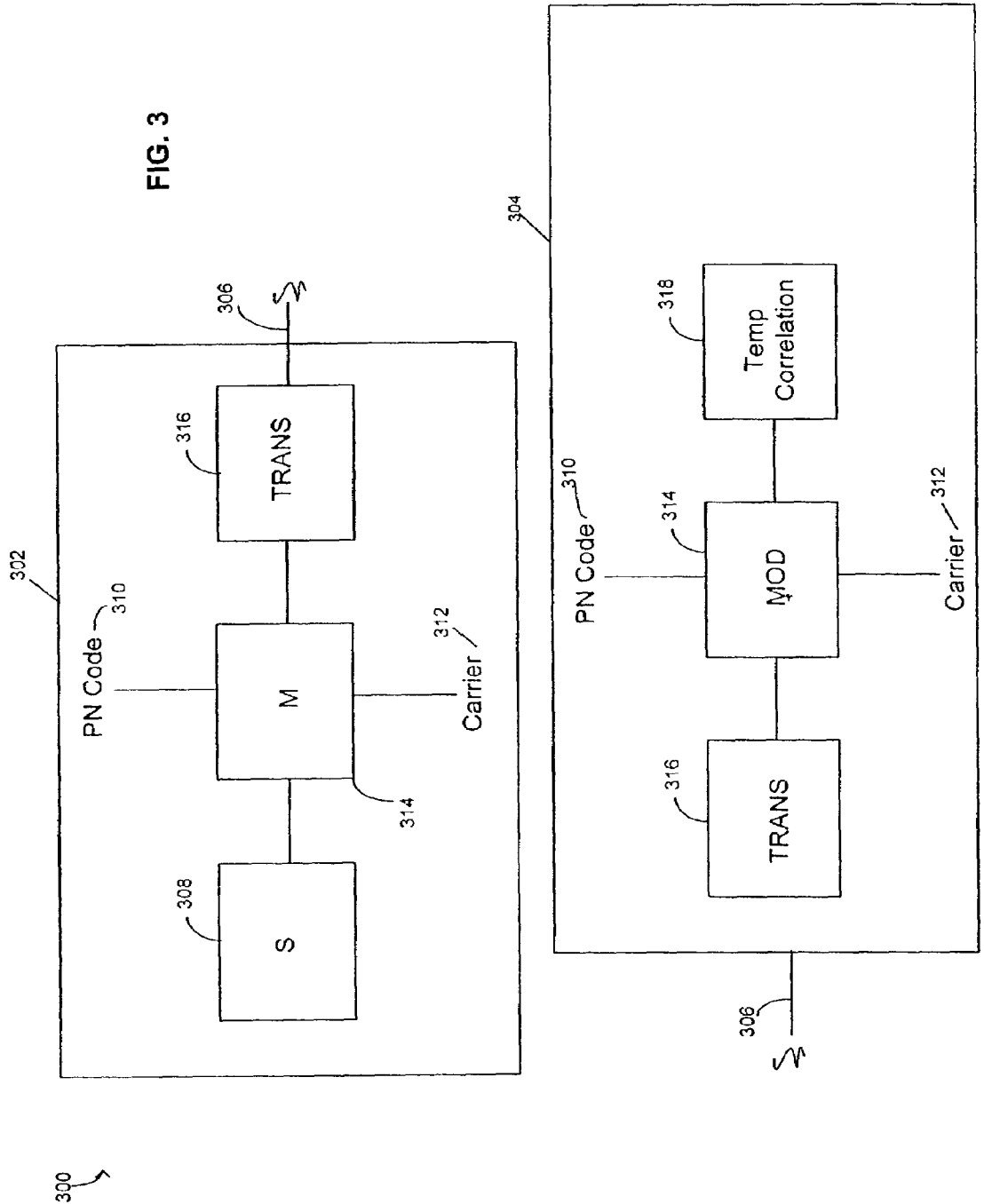

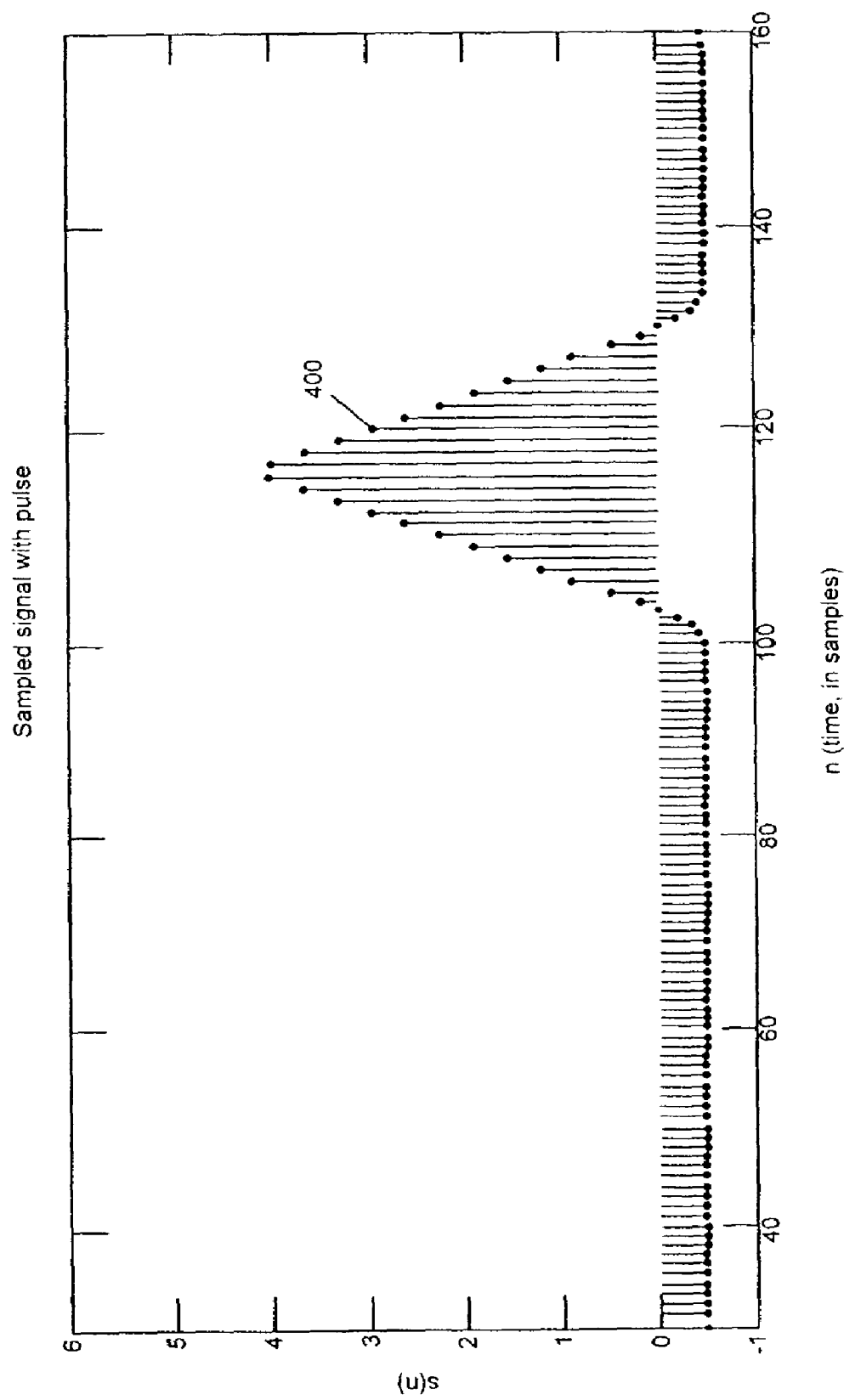

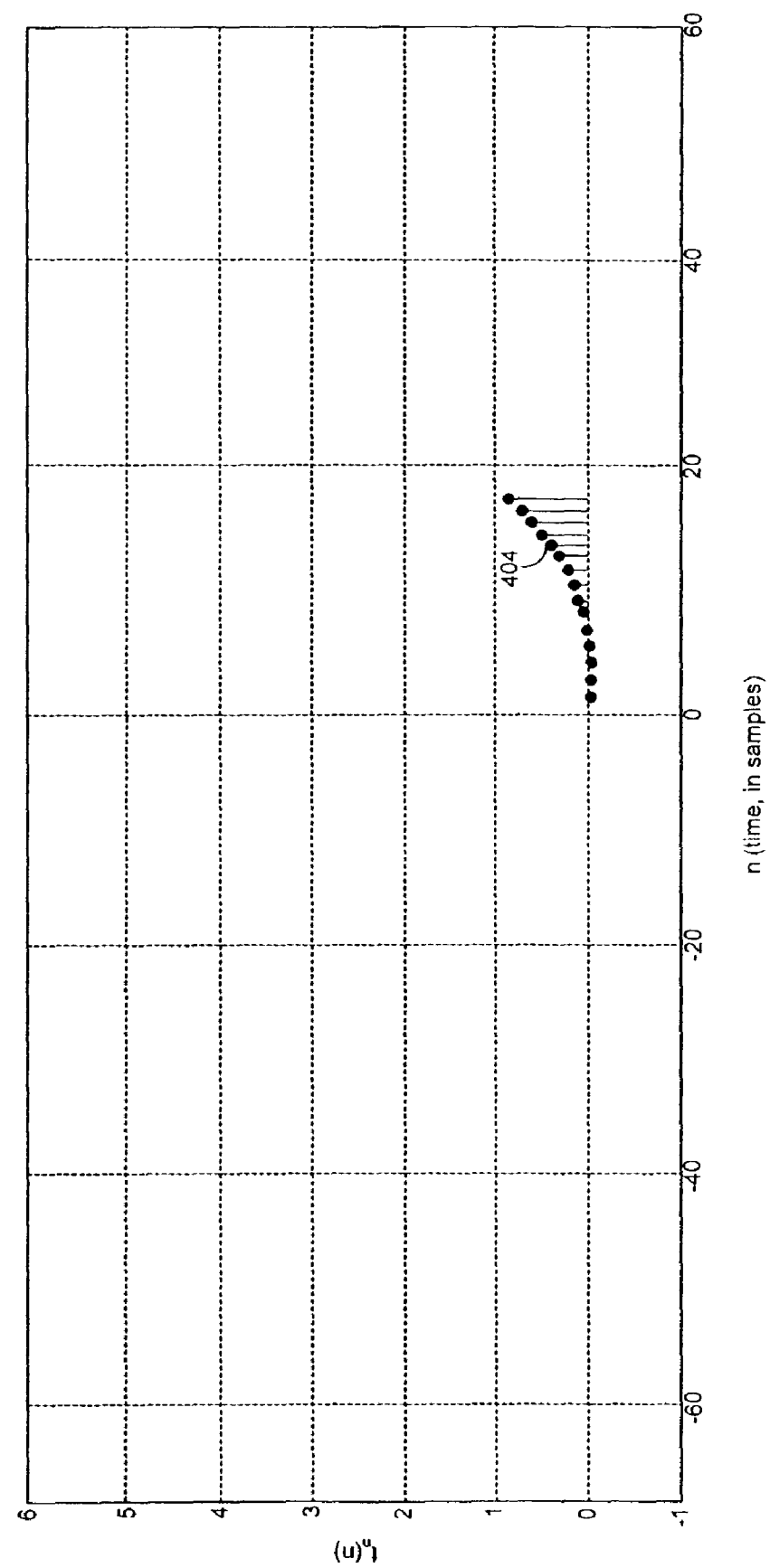

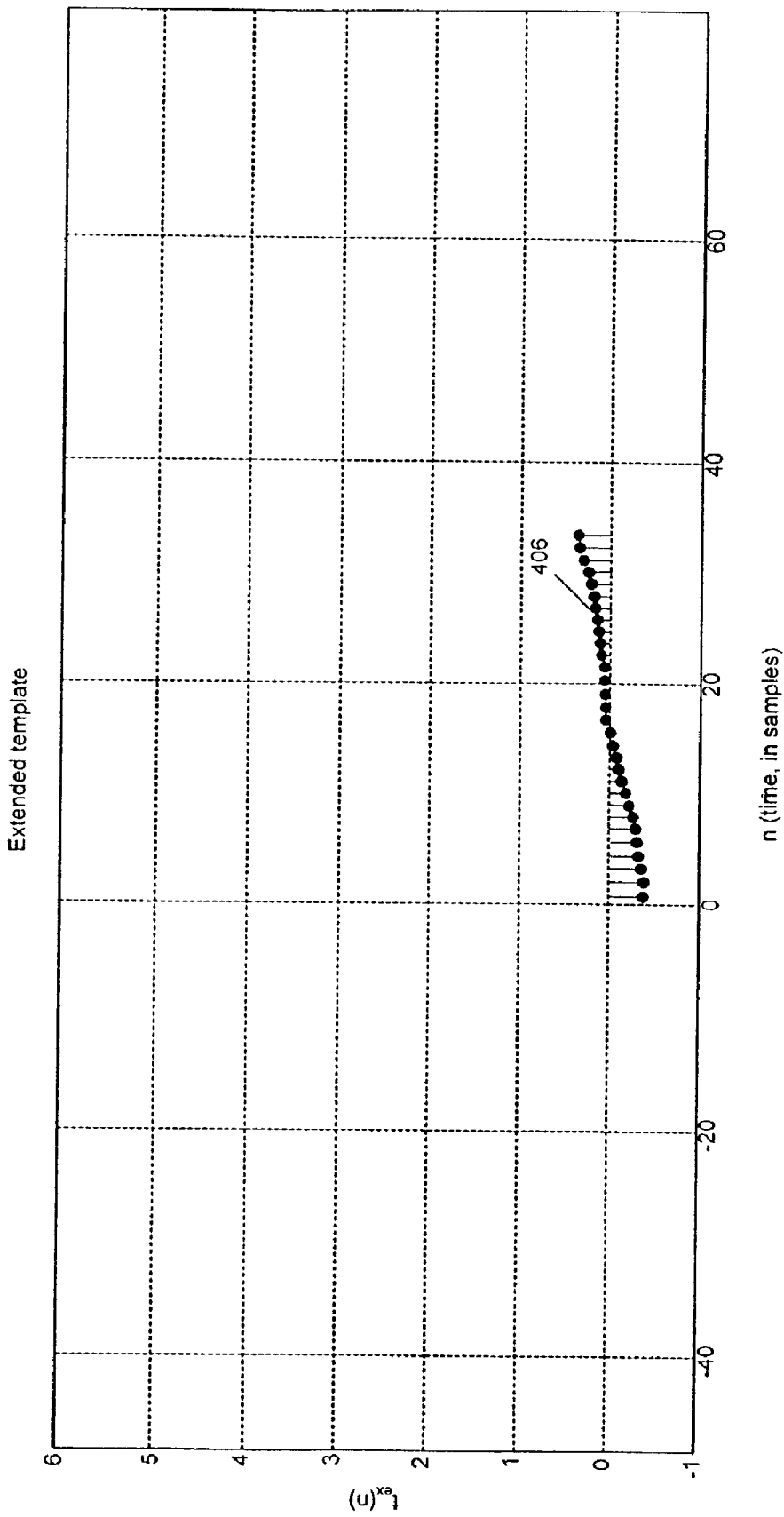

FIG. 5A
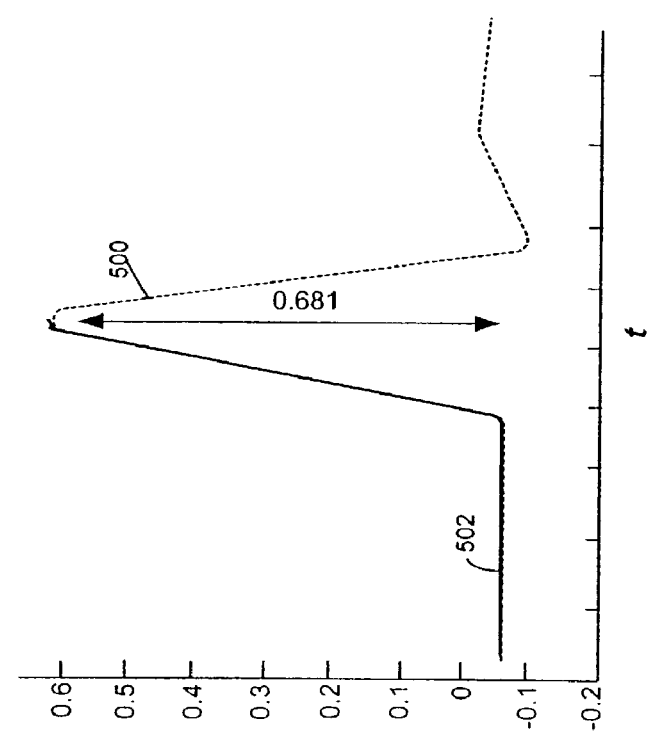
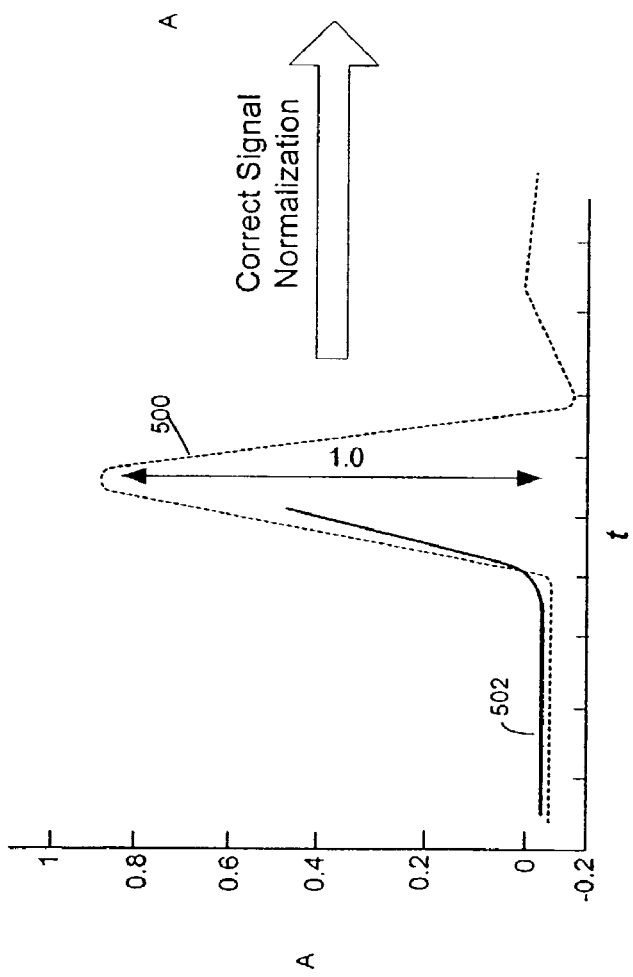

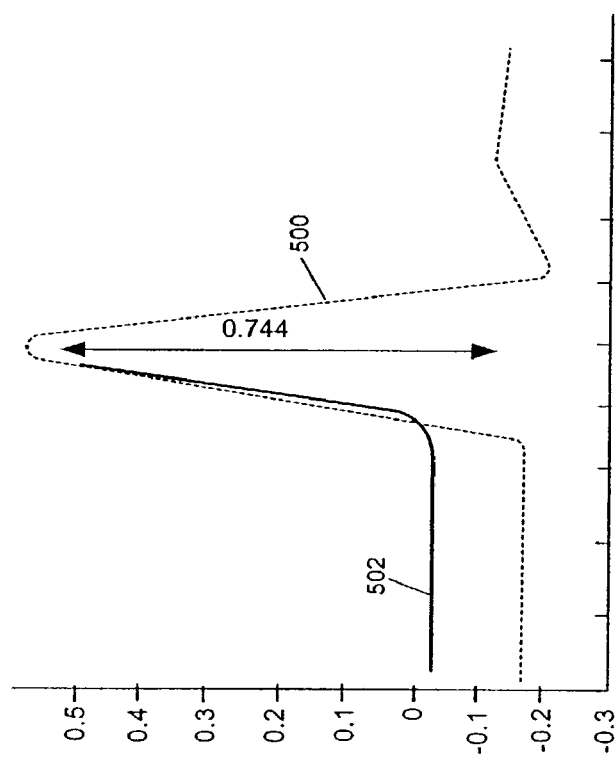
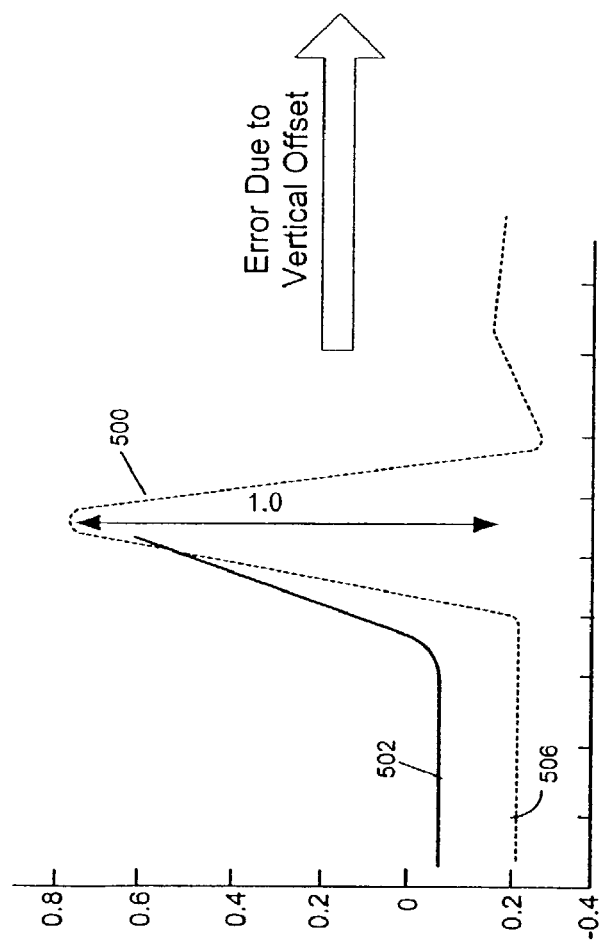
FIG. 5B

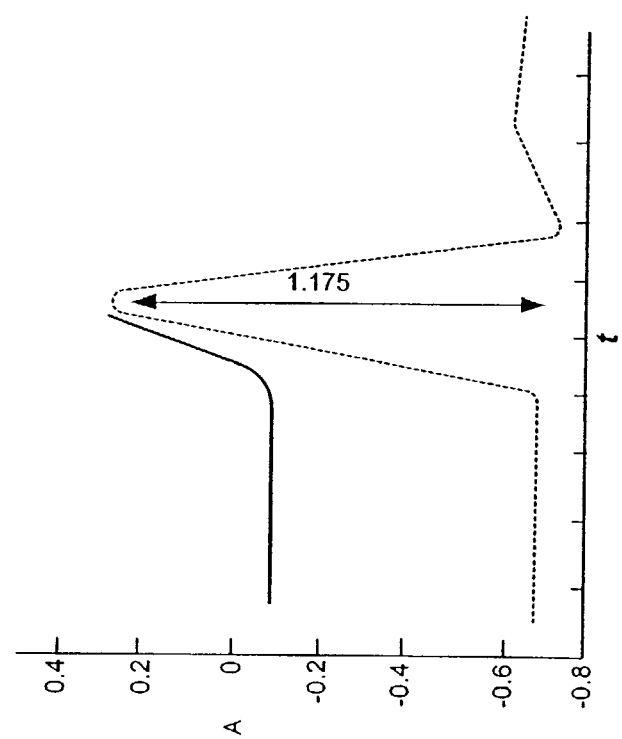
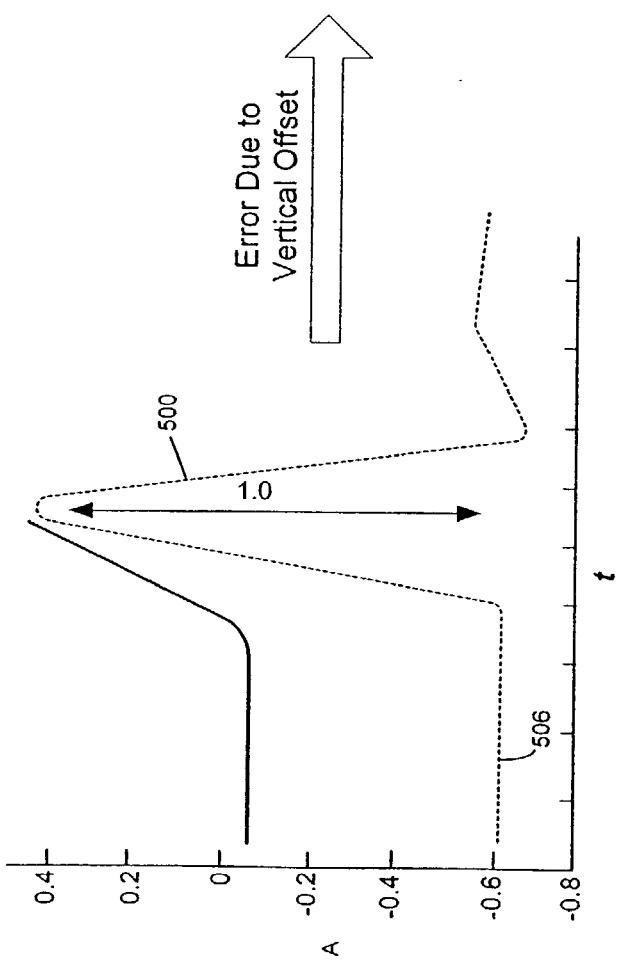
FIG. 5C

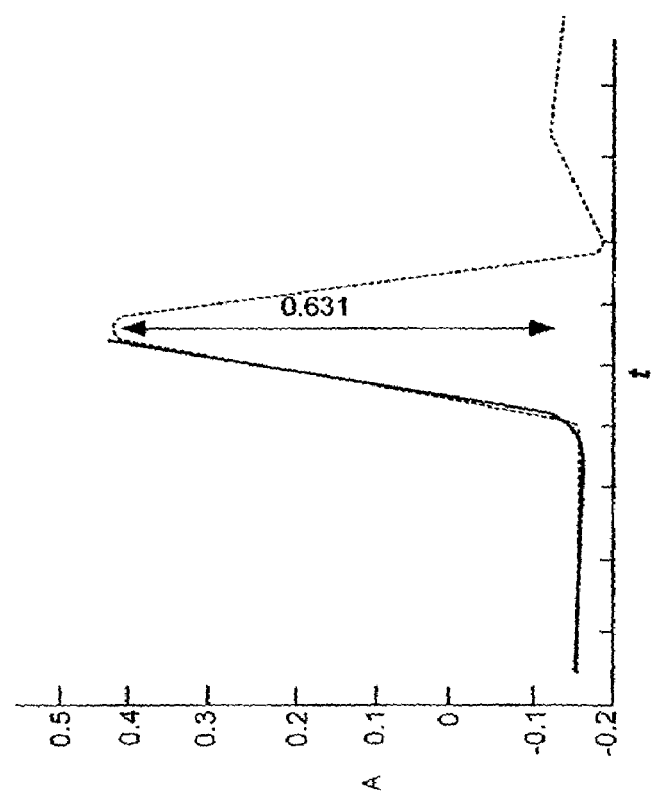
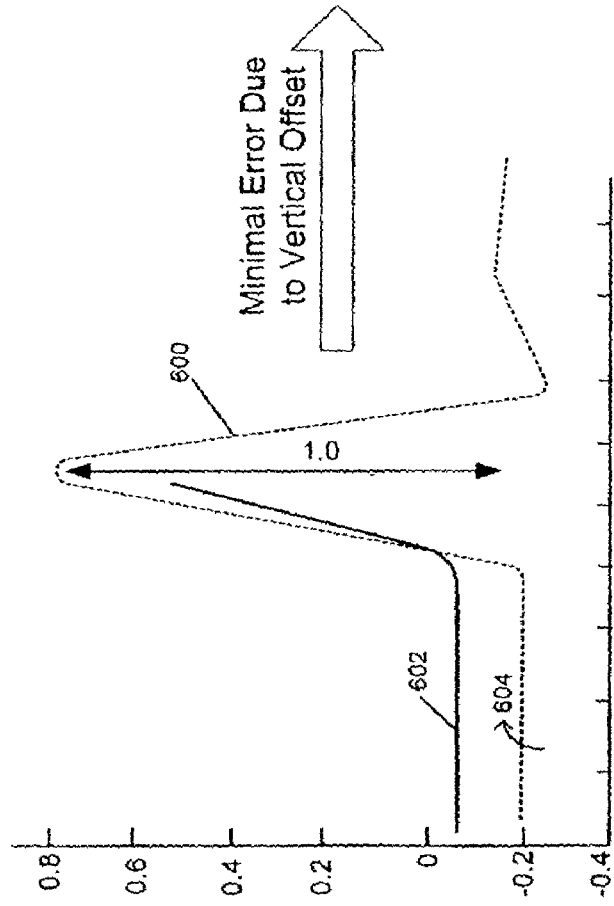
FIG. 6B

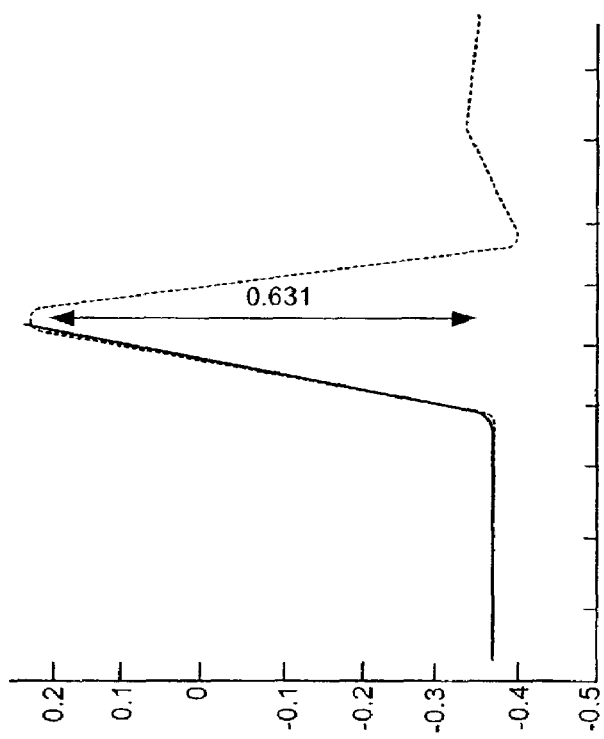
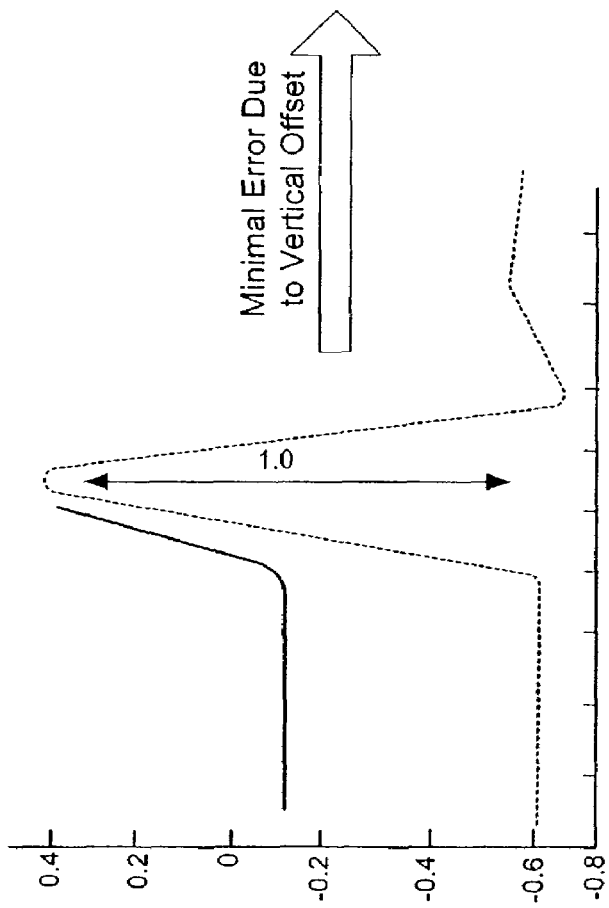
FIG. 6C

AMPLITUDE-OFFSET INVARIANT TEMPLATE DETECTION FOR PULSE POSITION ESTIMATION; METHODS, SYSTEMS AND PROGRAM PRODUCTS

This application claims the benefit of the filing date of Provisional Application No. 60/346,713, filed Oct. 25, 2001, assigned by the same assignee as that of the present invention and fully incorporated herein by reference.

BACKGROUND OF INVENTION

1. Field of Invention

This invention relates to pulse position detection systems, methods and program products. More particularly, the invention relates to amplitude-offset invariant template detection for pulse position estimation: methods, systems and program products.

2. Description of Prior Art

The operation of many discrete systems is based on analysis of a signal in order to find the existence and position (in time) of a predetermined shape. Laser-scanner decoding, mobile ranging, and digital signal processing for feature extraction all depend on knowledge of the position of particular shapes within a signal, not merely their existence. This type of positional analysis is useful in any application where an output or intermediate stage is designed to produce an amplitude-varying signal whose "pulses" correspond to particular events of importance. Determination of the position of said "pulses" (and hence, of the monitored events) may be accomplished by a variety of methods, including comparison of the amplitude to some set threshold and the novel approach presented in *"Spread Spectrum Indoor Geolocation"* by B. Peterson, C. Kmiecik, R. Hartnett, P. Thompson, and J. Mendoza published in the Journal of the Institute of Navigation, Vol. 45, No. 2, Summer 1998 (reference 1)

The accuracy of many pulse-position detection systems, however, becomes suspect in the presence of noise corruption and multipath impairments (the random combination of multiple, time-shifted versions of the signal). Though there are several techniques available to combat multipath impairments, the template cross-correlation method has the distinct advantage of being inherently resistive to such degradation, as illustrated in ref. 1 This technique, though robust against noise corruption and multipath, suffers from poor accuracy in analyzing vertically shifted signals (shifts with respect to the amplitude axis, not time).

One practical example where this inherent weakness affects system performance is amplitude offset caused by multipath in direct sequence code division multiple access (DS-CDMA) systems, illustrated in FIGS. 1A, B and C where signal amplitude (A) is shown as a function of time (t). The output of a DS-CDMA correlator, a component of the typical receiver structure, is a signal 100 consisting of pulses 102 interspersed with relatively low signal levels. The level of these intermediate points is a function of the spreading sequence used—specifically, of the autocorrelation function of the sequence. It is common for the spreading sequence's autocorrelation to appear similar to the correlation signal shown in FIG. 1A, where the signal level 104 between pulses is not 0, but maintains a relatively large magnitude compared to that of the pulse, itself. Large magnitudes between pulses are typically associated with short spreading sequences and partial correlations (the procedure of treating a large spreading sequence as groups of smaller sequences, usually split along bit-scale divisions, in order to simplify the correlation procedure at the cost of weakened autocorrelation properties). When more than one such signal 106 is combined, with random time shifts (the case when transmitted in many wireless environments), the effect is an amplitude shifting of the peaks of the signals—even if no actual "distortion" of the peaks occur. The sum of FIGS. 1A and B creates an offset 108, shifting of the signal below the time axis, as shown in FIG. 1C.

Though this vertical shift 108 has no effect on the position (in time) of the signal pulses, the template cross-correlation is affected as shown in FIGS. 2A, B and C where the template 200 (dark line) correlates best to the signal 102 (dotted line) at different points because of offset 202 or vertical signal shift. Because the template's vertical offset 204 is static, rather than correlating best with the signal 102 at the point where the peak 206 actually occurred, the template correlates best at different positions, depending, not on the time axis, but on the vertical position of the signal. Additionally, because the template cross-correlation method requires that the signal be normalized prior to template correlation (in order to counteract any effects from the signal being modulated), vertical offsets can cause the system to use incorrect normalization factors—distorting the shape of the signal as will be described hereinafter in FIGS. 5A, B, and C. Multipath, therefore, affects the horizontal position estimate, not only by distorting the pulse shape, but also through vertical shifting of the signal. The tolerability of this effect depends on the sharpness of the pulses (typically "dulled" in practical systems by low-pass filtering) and the accuracy desired in the system.

Having shown that template cross-correlation is sensitive to amplitude offsets and that there is at least one practical application where this weakness can cause system inaccuracy, the need for an amplitude-offset invariant template detection method has been established.

Prior art related to signal detection via template cross-correlation includes:

(1) U.S. Pat. No. 5,910,905 issued Jun. 8, 1999 discloses detecting the presence of dispersed broadband signals in real time. The present invention utilizes a bank of matched filters for detecting the received dispersed broadband signals. Each matched filter uses a respective robust time template that has been designed to approximate the dispersed broadband signals of interest, and each time template varies across a spectrum of possible dispersed broadband signal time templates. The received dispersed broadband signal x(t) is received by each of the matched filters, and if one or more matches occurs, then the received data is determined to have signal data of interest. This signal data can then be analyzed and/or transmitted to Earth for analysis, as desired. The system and method of the present invention will prove extremely useful in many fields, including satellite communications, plasma physics, and interstellar research. The varying time templates used in the bank of matched filters are determined as follows. The robust time domain template is assumed to take the form $w(t)=A(t) \cos\{2.\phi.(t)\}$. Since the instantaneous frequency f(t) is known to be equal to the derivative of the phase $.\phi.(t)$, the trajectory of a joint time-frequency representation of x(t) is used as an approximation of $.\phi.'(t)$.

(2) U.S. Pat. No. 6,342,854 issued Jan. 29, 2002 discloses a position determining system, for receiving digital telephone signals transmitted by a number of transmission sources BTS. The system has a pair of receiving stations, CBU and CRU, one at a known position O and another on a roving object R; a position determining processor CPP; and means for passing a link signal, L1 and L2, from each of the receiving stations to the position determining processor, the link signal containing information about the signals received at the receiving station from the transmission sources. Each of the receiving stations is arranged to receive the signals from the respective transmission sources substantially simultaneously. The position determining processor is arranged to compare the information received from the one receiving station with the information received at the other receiving station, and to determine the time delay between the respective signals received at both receiving stations in order to determine the position of the roving object.

None of the prior art discloses or suggests correlating a received signal with a template of the transmitted signal to determine and correct modulation and offset effects in the received signal thereby obtaining a more accurate pulse position detection. Similarly, none of the prior art provides solutions meeting the particularly stringent accuracy requirements necessary for real-time location tracking in the IEEE 802.11 local-area-network signal environment.

INVENTION SUMMARY

In a mobile communication system, including at least one mobile station in the IEEE 802.11 signal environment communicating with at least one access point or base station, a method of determining and correcting for modulation and offset effects in a received signal includes a first step of receiving a DS CDMA signal [s(n)] subject to modulation effects, A, on pulse shape or peak [p(n)] and vertical offset, B, due to multipath where "n" is the index into the samples of the signal. A second step stores a template of length N, incorporating a replica of the predetermined DS CDMA correlation signal [s(n)], or "peak", without multipath or vertical offset. A third step normalizes the template and generates either an extended template or a balanced template. A fourth step correlates the extended or balanced template with the received signal [s(n)] by shifting the extended or balanced template along the received signal to estimate modulation effects of A at a particular time, n. A fifth step subtracts various sample shifted versions of the template from the modulation-compensated (using the estimate of A for the particular time, n) received signal. A sixth step calculates the average difference between the template and the modulated signal [p(n)] to determine the magnitude of the offset B for a particular time, n. A seventh step determines the squared error between the corrected template (for A and B) and the received signal, assuming the minimum error to correspond to the correct time of arrival for location tracking in the IEEE 802.11 signal environment.

An aspect of the invention is detecting the position in time of a predetermined shape within an analog or digital signal, irrespective of any amplitude modulations and/or offsets within the signal.

Another aspect of the invention entails estimating any signal modulations and/or offsets in order to provide correction for the position estimate.

Another aspect removes or minimizes any signal offsets or modulations present in the signal prior to position estimation.

Another aspect manipulates a predetermined received signal to form a template of variable length, used for comparison purposes with the received signal.

Another aspect estimates any signal modulations and offsets to provide correction for the template.

Another aspect manipulates predetermined signal shape into a balanced template for comparison purposes with a received signal, the integral (analog) or sum (discrete) of which is precisely equal to zero.

Another aspect manipulates the template by antisymmetric concatenation into an extended template for comparison purposes with a received signal, such that the integral (analog) or sum (discrete) of the extended template is approximately equal to zero.

Another aspect detects the time of arrival of a received data bit in a wireless communication system using analog or digital analysis, irrespective of any amplitude modulations and/or DC offsets in the received signal.

Another aspect uses received multipath estimation (or channel estimation) to determine any amplitude offset and/or modulations.

DESCRIPTION OF THE DRAWINGS

The invention will be further understood from the following detailed description of a preferred embodiment taken in conjunction with an appended drawing, in which:

FIG. 1A illustrates an original Barker code correlation signal in a prior art 802.11 DS-CDMA system;

FIG. 1B illustrates the time-correlation signal resulting from a time-shifted multipath arrival of FIG. 1A;

FIG. 1C illustrates the sum of FIGS. 1A and B, with resulting amplitude offset effects;

FIG. 2A illustrates correlation of a template with a signal similar to that of FIG. 1A;

FIG. 2B illustrates correlation of the template of FIG. 2A with an amplitude-offset version of the signal in FIG. 2A;

FIG. 2C illustrates correlation of the template of FIG. 2A with a further amplitude-offset version of the signal in FIG. 2A;

FIG. 3 is a representation of an 802.11 DS_CDMA communication system, as one embodiment, incorporating the principles of the present invention;

FIG. 4A is a representation of a received pulse signal in the system of FIG. 3;

FIG. 4C is a representation of the template of FIG. 4B after normalization;

FIG. 4D is a representation of an extended template for correlation with the received pulse signal of FIG. 4A;

FIG. 5A is graphical representation of a received signal without offset (left) correlated with a standard template, the resulting signal amplitude-corrected to match the template amplitude (right) with a correct normalization factor, in the system of FIG. 3;

FIG. 5B is a graphical representation of the received signal correlated with a standard template and elevated due to amplitude offset (left), the resulting amplitude-corrected signal (right) incorrectly normalized because of the presence of offset and not matching to the template due to both the offset and amplitude modulation, in the system of FIG. 3;

FIG. 5C is a graphical representation of the received signal correlated with a standard template and elevated due to amplitude offset,(left), the resulting amplitude-corrected signal (right) incorrectly normalized because of the presence of an offset and not matching to the template due to both the offset and amplitude modulation, in the system of FIG. 3;

FIG. 6B is a graphical representation of a received signal correlated with a standard template using the technique of the present invention and elevated due to amplitude offset (left), such that the templating procedure corrects for offset and amplitude variation, resulting in a relatively accurate normalization factor and template matching, in the system of FIG. 3;

FIG. 6C is a graphical representation of a received signal correlated with standard template using the technique of the present invention, and further elevated due to amplitude offset, (left) such that the templating procedure corrects for offset and amplitude variation, resulting in a relatively accurate normalization factor and template matching, in the system of FIG. 3;

DESCRIPTION OF PREFERRED EMBODIMENT

Figure 4B:
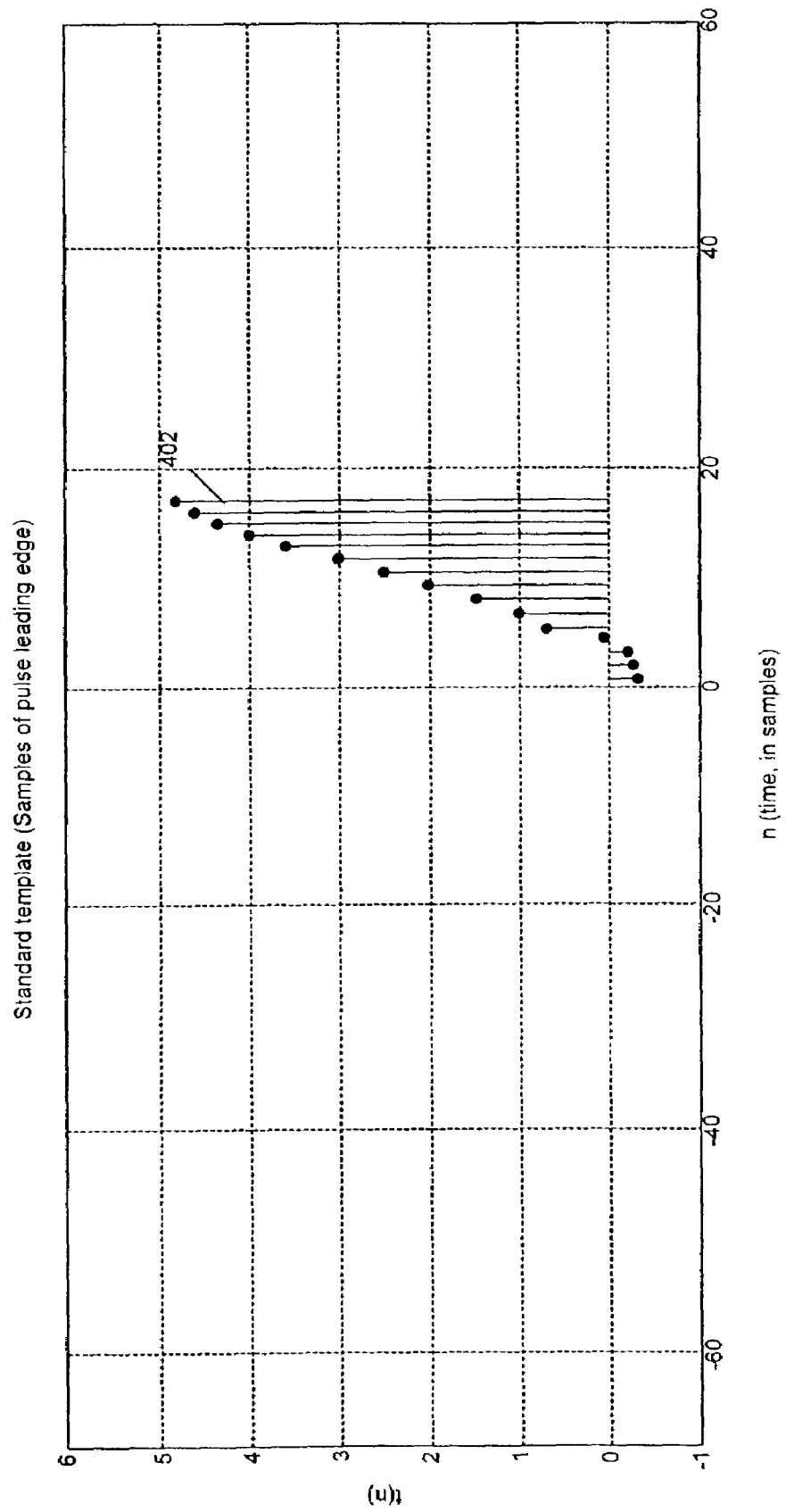
FIG. 4B is a representation of a standard template for correlation with the signal of FIG. 4A in the system of FIG. 3.

Assume that a single predetermined shape or "peak" is contained in the discrete sequence, p(n), which is modulated by the channel and amplitude offset by the effects of multipath. (We do not incorporate noise at this time.) The received signal, s(n), for the length of one bit period, T, may therefore be defined below in equation 1:

$$\tilde{s}(n) = A \cdot p(n) + B; 0 \leq n \leq T$$

Where:
A=Signal Modulation Constant
B=Signal Amplitude Offset
p=Received Signal Peak
n=Time, in samples
T=Single Bit Period, in samples A and B are arbitrary constants representing modulation and an amplitude offset, respectively. It is necessary to compensate for A and B so that the position of p(n) may be determined accurately.

Further assume that the template is k samples shorter than p(n). Rather than the full "peak", the template represents the "leading edge" of the "peak". Therefore, the template of length T−k=N, is defined below in equation 2 as:

$$\tilde{t}(n) = p(n), 0 \leq n \leq N-1$$

For simplicity, define a template in equation 3 below with normalized energy, such that $$\sum_{n=0}^{N-1} t(n)^2 = 1$$

The normalized template may be written, below, in equations 4 and 5, in terms of any template given by eq. (2):

$$\text{norm} = \sqrt{\sum_{n=0}^{N-1} \tilde{t}(n)^2}$$

$$t(n) = \tilde{t}(n)/\text{norm}$$

Further assume that an extended template, $t_{ex}(n)$, is defined below in equation 6 as follows:

$$t_{ex}(n) = \begin{cases} -t(N-1-n), & n \geq N-1 \\ t(n-N), & n \geq N \end{cases}$$

Making it the antisymmetric extension of t(n) (in the reverse time direction) to a length of 2N. This extended template has the property defined below in equation 7:

$$\sum_{n=0}^{2N-1} t_{ex}(n) = 0$$

Another method of achieving this same result involves shifting the original template by a set amount which balances the template about the horizontal axis (zero amplitude), as defined below in equation 8:

$$t_{bal}(n) = \begin{cases} t(n) - \dfrac{\left(\sum_{n=0}^{N-1} t(n)\right)}{N}, & \sum_{n=0}^{N-1} t(n) \text{ positive}; \\ t(n) + \dfrac{\left(\sum_{n=0}^{N-1} t(n)\right)}{N}, & \sum_{n=0}^{N-1} t(n) \text{ negative}; \end{cases} \quad 0 \leq n \leq N-1$$

resulting in the desired property defined below in equation 9:

$$\sum_{n=0}^{2N-1} t_{bal}(n) = 0$$

Determining which of the above methods to use in a specific system is a function of the time duration and shape of the original template (based on the "peak" shape), as well as the particular impairments of the environment in which the system is expected to perform. The extended template provides more samples, and, in general, greater noise immunity, while the balanced template is better tailored for matching to the signal "peak" precisely. NOTE: For the duration of this embodiment, it should be assumed that $t_{ex}(n)$ and $t_{bal}(n)$ are interchangeable, depending on the specific circumstances of system operation, as long as only one is consistently used throughout.

In order to correctly estimate the peak position based on the received signal, it is desirable to first estimate A and B. By correlating s(n) to the extended template, the effects of the amplitude offset (B) are mitigated by the "balanced" property of the extended template, $t_{ex}(n)$. This may be illustrated below in equation 10 by applying the superposition principle to separate the signal into its individual components and noting the effect of correlation (written in terms of convolution) to the template:

$$t_{ex}(-n) * s(n) = t_{ex}(-n) * (A \cdot p(n) + B) = t_{ex}(-n) * A \cdot p(n) + t_{ex}(-n) * B$$

Since the correlation of $t_{ex}(n)$ and the constant, B, at any single n, may be written below in equation 11, as follows:

$$\sum_{n=0}^{2N-1} B \cdot t_{ex}(n) = B \cdot \sum_{n=0}^{2N-1} t_{ex}(n) = 0$$

the correlation of the signal and the extended template is not affected in any way by the addition of an arbitrary constant to the signal as described below in equation 12:

$$\tilde{A}(n) = t_{ex}(-n) * s(n) = t_{ex}(-n) * (A \cdot p(n) + B) = t_{ex}(-n) * A \cdot p(n)$$

The extended template will correlate particularly well with the received signal at one particular time, n=pulse position. The resultant output of the correlator will be as defined below in equation 13:

$$t_{ex}(-n) * A \cdot p(n) =$$

$$\sum_{n=0}^{N-1} 0 \cdot t_{ex}(n) + A \cdot \sum_{n-N}^{2N-1} t_{ex}(n) p(n-N) = 0 + A \cdot \sum_{n=0}^{N-1} t(n) p(n)$$

In equation 14 below, p(n) may be rewritten using the original definitions, above, $$p(n) = t(n) \cdot \text{norm}; \; 0 \leq N \leq n-1$$

The output of the correlator may be rewritten and simplified (using the normalization property of the template, given above) and defined below in equation 15:

$$\tilde{A}(n) = t_{ex}(-n) * A \cdot p(n) = (A \cdot \text{norm}) \cdot \sum_{n=0}^{N-1} t(n) t(n) = A \cdot \text{norm}$$

Therefore the system functions based on the assumption, defined below in equation 16:

$$\tilde{A}(n) = t_{ex}(-n) * s(n) = \text{estimate}\{A \cdot \text{norm}\} \text{ for template at time } n$$

The next step involves a samplewise subtraction of various sample-shifted versions of the template from the received signal. Note: When the template, t(n), is subtracted from the received signal, it is assumed that this is the error value for the assumption of a time of arrival. This method of calculating the error (deviation of the received signal from the known template) relies on the signal being modulated correctly and amplitude shifted appropriately, both to match up to the template. Therefore, for each shifted template, the system should divide by the appropriate estimate of the modulating coefficients in order to remove the effects of modulation from the error calculation. Additionally, an estimate of the amplitude shift, B, may be obtained by calculating the average difference between the template and the appropriately modulated signal, as set forth below in equation 17:

$$\tilde{B}(n) =$$

$$\frac{1}{N} \sum_{k=0}^{N-1} \frac{s(k-n)}{\tilde{A}(n)} - t(k) = \text{estimate}\{B/(A \cdot \text{norm})\} \text{ for template at time } n$$

Finally, the total squared error is calculated for each time shift of the template (with the appropriate vertical shift to account for the effect of B on the signal), as described below in equation 18:

$$e(n) = \sum_{k=0}^{N-1} \left( \frac{s(k-n)}{\tilde{A}(n)} - \left[ t(k) \tilde{B}(n) \right] \right)^2; \; \text{length } t_{ex}(n) \leq n \leq \text{length } s(n)$$

The lower bound on n in this error function compensates for a causal signal, s(n), in which the first few correlations of any template to the signal will be correlations primarily to zeroes by virtue of the signal not existing at that time and will be, therefore, invalid (the error function will necessarily be small without there being a "good" correlation). The smallest value in this error function is assumed to correspond to the pulse's position, where the signal correlates best with the template for the leading edge of the peak.

It should be noted that the length of the template plays a significant role in the system's response to particular impairments. Shorter templates are better suited for distinguishing tightly spaced multipath arrivals, while longer templates respond better to the effects of noise. Length, in combination with the shape of the template, can also dictate the selection of $t_{ex}(n)$ or $t_{bal}(n)$, as described earlier.

Finally, it is important to make clear that the techniques presented here, though given in a discrete form, apply to analog signals, as well. With some common assumptions, such as a bandlimited signal and a sufficiently high sampling rate, analog domain template cross-correlation can be translated to a discrete domain, where the above equations may be applied directly.

In order to illustrate the loss in accuracy suffered by template cross-correlation in the presence of amplitude offsets and the corresponding advantage of using the submitted offset invariant techniques, a practical example is presented. IEEE 802.11 is achieving widespread acceptance as an indoor wireless data transmission standard. Mobile ranging in such a system would require the ability to accurately determine time of arrival (TOA) of any data transmitted from a transmitting unit to a receiving unit. 802.11 DS-CDMA systems use a relatively short spreading sequence for data transmission. As previously mentioned, short sequences can result in signal offsets in the presence of multipath impairments.

In FIG. 3, a Spread Spectrum System 300, in one embodiment a Direct Sequence Spread System (DSSS), comprises a transmitter 302 and a receiver 304 coupled to a link communications channel 306. DSSS systems are known in the art and described, for example, in the text *Wireless Communications—Principles and Practice* by T. S. Rapport, published by Prentice Hall, Upper Saddle River, N.J., 1996, Sect. 5.1 (ISBN 0113-375536-3) (reference 2). While a DS System will be described, it should be understood that other Spread Spectrum Systems might be implemented using the principles of the present invention. Moreover, the invention has application in areas other than tracking, as for example bar code scanning, digital signal processing, image processing and in other systems where a signal is altered by the environment.

The transmitter 302 generates a spreading waveform for a signal 308 that can be several orders of magnitude greater than the minimum required signal bandwidth, enabling multiple users to simultaneously use the same bandwidth without significant interference with one another. The spreading waveform is controlled by a pseudo noise code 310, which is a sequence of bytes or chips with noise-like properties. The PN code, in one embodiment a Barker code used in 802.11, and a carrier source 312 are combined in a modulator 314 where the bandwidth is a direct function of the chip rate of the code. The modulated signal is applied to a transceiver 316 which provides an output signal (not shown) to the communication channel 306, subject to multipath and noise for transmission to the receiver 304. In the receiver, a transceiver 316' receives and provides the received signal to a modulator 314' which combines the received signal with the carrier signal 312' and a copy 310' of the transmitter PN code 310. A time shifted version of the signal 308 is provided to an amplitude invariant template correlator 318 for time of arrival determination (including correction of modulation and offset effects in the received signal) as will be described in FIGS. 5A, B, and C and FIGS. 6A, B and C.

The standard 11-chip Barker sequence has autocorrelation properties similar to those illustrated in FIGS. 1A, B and C with k=1/11. The DS-CDMA system was simulated with a 7.7 MHz cutoff, $5^{th}$ order Butterworth low-pass filter in line with the transmitter output and matched filtering (also low-pass filtered) to the Barker sequence in the receiver. The output correlation stream is then template cross-correlated to determine the time of arrival (TOA) of transmitted pulses.

Figure 4E:
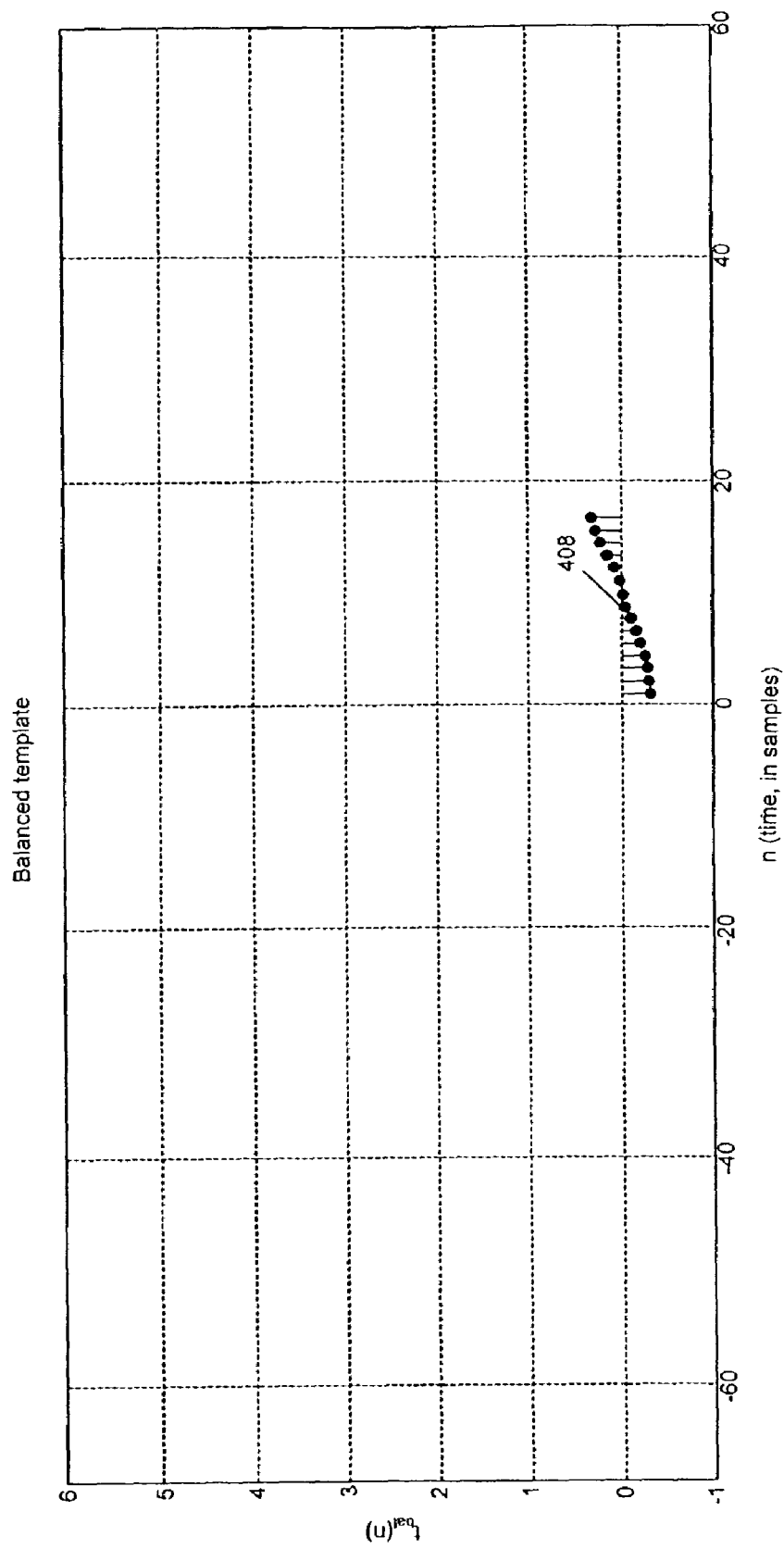
FIG. 4E is a representation of a balanced template for correlation with the received pulse signal of FIG. 4A.

In FIG. 4A, a representation of s(n), (see equation 1), a transmitted pulse 400 is apparent, the leading edge of which is incorporated into a standard template 402 shown in FIG. 4B and described in equation 2 for correlation with the received signal 400 at the receiver. The template 402 is normalized according to equation 5 and represented in template 404 shown in FIG. 4C. An extended template 406, shown in FIG. 4D, may be created from the normalized template 404 according to equation 6. Alternatively, a balanced template 408 may be created according to equation 8 and as shown in FIG. 4E Simulation results showed that the amplitude shift caused by the combination of two equal-amplitude signals corresponded to a time shift of one sample in the template-obtained position estimate. Sampling the received signal at 88 MHz, this corresponded to a shift by 11.36 ns—significant in many ranging applications. Considering that typical multipath channel models, such as the model defined in "*Statistical Characteristics of Indoor Multipath Propagation Predicted by Ray Tracing Simulation*" by H. Suzuki, A. Mohan, T. Yakabe, and H. Yabe published in the Bulletin of the University of Electro-Communications, Vol. 8, No. 1, and June 1995 (reference 3), include several multipath arrivals (and, hence, more than one samplewise shift), this impairment can degrade the accuracy of the template cross-correlation method beyond the point of usefulness in a typical time of arrival application.

FIGS. 5A, B and C illustrate the accuracy degradation. The individual Figures illustrate the signal 500 and the template 502 being correlated at the correct time of arrival (when the signal should correlate best to the template and the error should be minimal) for different vertical signal offsets. In FIG. 5A, no offset is present—Though the signal 500 is modulated by a constant factor (left), the system normalizes it correctly (right), and the template ($t_{ex}$—solid line) correlates well. The signal amplitude (right) after normalization is reduced to 0.681 from 1.0. In FIG. 5B, an offset =−0.1, is present. Though the signal is modulated by the same constant as in FIG. 5A, the system normalizes the signal incorrectly indicated by a signal amplitude (right) of 0.744 when it should be 0.681 for the non-offset state. In addition, the vertical shift makes the signal "appear" further right, from the template's point of view. In FIG. 5C, an increased offset =−0.5 is present. Though the signal is modulated by the same constant, the system again normalizes incorrectly indicated by signal amplitude (right) of 1.175 when it should be 0.681 for the non-offset state. (The signal is actually further from ideal after normalization); The vertical shift makes the signal "appear" further, right from the template's point of view. Note how the "match" between the signal and the template worsens with increasing DC offset.

Figure 6A:
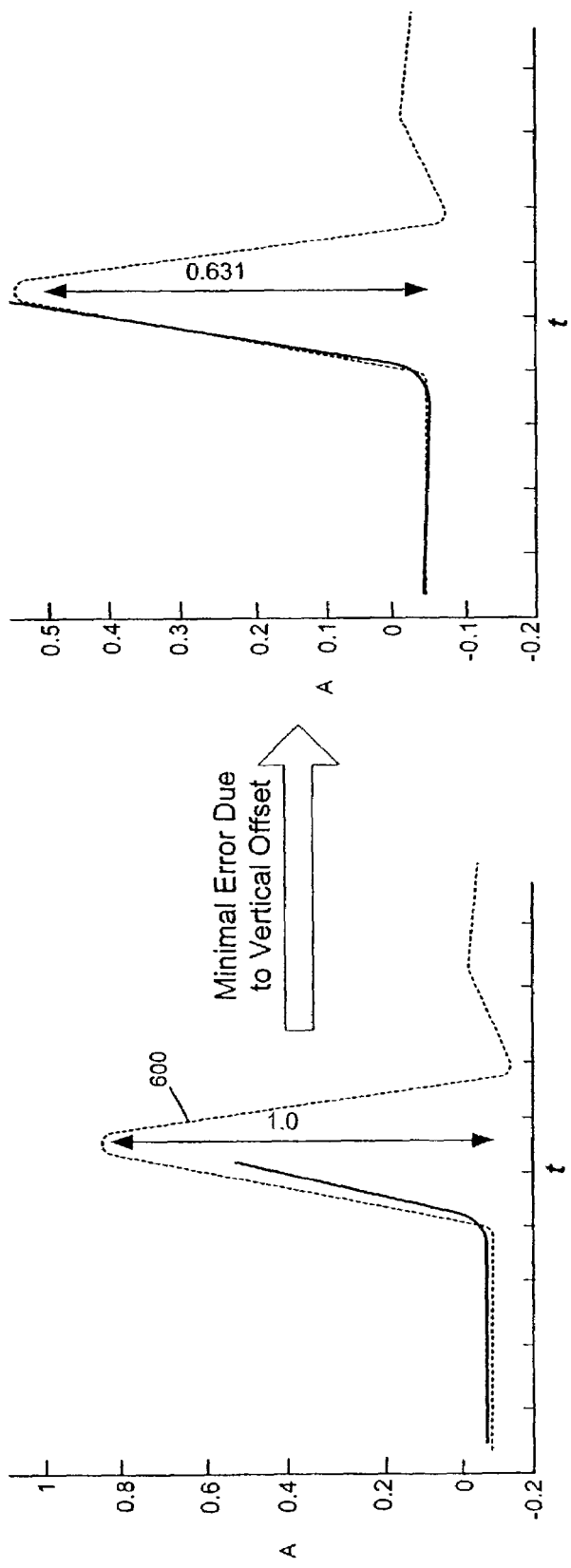
FIG. 6A is graphical representation of a received signal without offset (left) correlated with a standard template using the technique of the present invention, such that the templating procedure corrects the signal (right) for offset and amplitude variation, resulting in a relatively accurate normalization factor and template matching, in the system of FIG. 3.

FIGS. 6A, B, and C illustrate the amplitude-offset invariant technique of the present invention (using an extended template) and the technique achieves far better accuracy than FIGS. 5B and C. Rather than treating the vertical position and amplitude of the signal as a single entity, the invariant technique compensates for the vertical offset of the signal and yields consistent normalization, as well as accurate time of arrival (because the template is free to shift vertically to "meet" the signal during the correlation step).

In FIG. 6A, without offset the signal amplitude (left) is 1.0 and after normalization the signal amplitude (right) is 0.631, slightly less than the correct signal amplitude, given in FIG. 5A, due to the additional processing of the signal in the amplitude invariant offset techniques as will be described in FIG. 7. In FIG. 6B, the signal offset (left) is the same as in FIG. 5B. The signal amplitude after normalization (right), however, is the same as the signal amplitude of FIG. 6A, and more accurate than the signal amplitude (right) of FIG. 5B due to the amplitude invariant offset technique of the present invention. Likewise, in FIG. 6C, the signal offset (left) is the same as in FIG. 5B The signal amplitude after normalization (right) is the same as the signal amplitude of FIG. 6A, and more accurate than the signal amplitude (right) of FIG. 5C.

In many applications that require the estimation of pulse position, the template cross-correlation of the prior art (reference 1) suffers an unacceptable loss in accuracy due to the presence of a variable signal. The amplitude-offset invariant template cross-correlation method, described here, is capable of operating on digital or analog signals, both in the presence and absence of such offsets, with minimal loss in accuracy.

Figure 7:
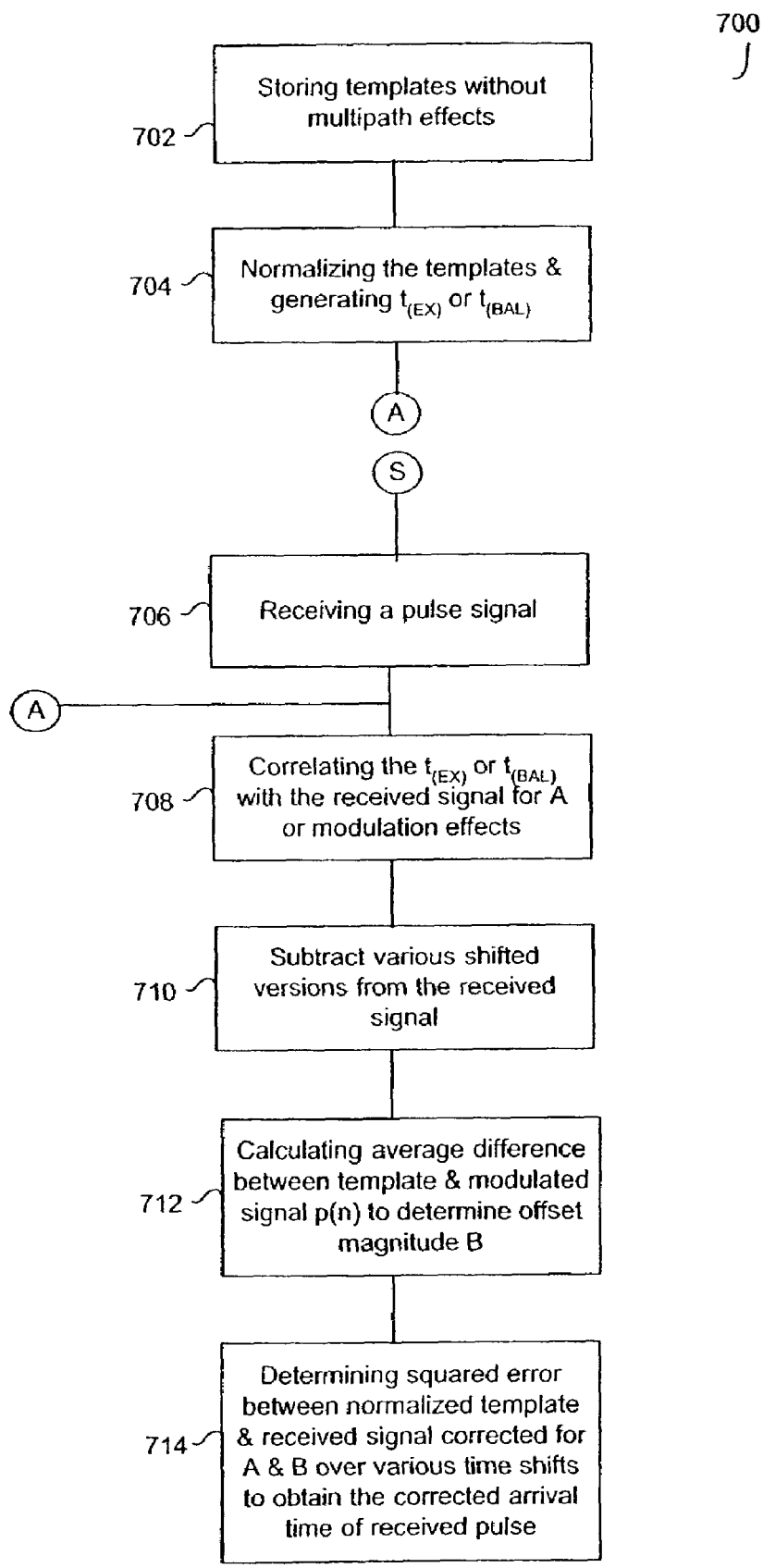
FIG. 7 is a flow diagram implementing the method of determining and correcting for modulation and offset effects in a received signal in an IEEE 802.11 signal environment in the system of FIG. 3.

In FIG. 7, a method 700 is described for determining and correcting for modulation and offset effects in a received signal. In a first step 702, templates ($t_{ex}$) or ($t_{bal}$) of length N are stored for signal processing. incorporating a replica of the signal [s(n)] without multipath or vertical offset. A second step, normalizes the template and generates either the extended template (FIG. 4*d*) or the balanced template (FIG. 4E). Steps 702 and 704 are conducted off-line before signal processing begins and provided at entry point A to on-line signal processing. A third step 706 begins on-line signal processing and receives the signal [s(n)] subject to modulation effects A on pulse shape or peak [p(n)] and vertical offset B due to multipath where "n" is a pulse rate or samples of the signal. The normalized templates are inputted at entry point A to the signal processing process. A fourth step 708 correlates ($t_{ex}$), the extended template, with the received signal [s(n)] by shifting the extended template along the received signal to estimate modulation effects of A at a particular time, n. A fifth step 710 subtracts various sample-shifted versions of the template from the modulation-compensated (using an estimate of A for the particular time, n) received signal. A sixth step 712 calculates the average difference between the template and the modulated signal [p(n)] to determine the magnitude of the offset B for a particular time, n. A seventh step 714 determines the squared error between the normalized template and received signal corrected for A and B over various time shifts to obtain the corrected arrival time of the received pulse, assuming the minimum error to correspond to the correct time of arrival for the signal in the IEEE 802.11 signal environment.

While the invention has been described in terms of a preferred embodiment various changes can be made therein without departing from the spirit and scope of the invention as defined in the appended claims, in which we claim:

The invention claimed is:

1. A method of detecting the position in time of a predetermined shape within an analog or digital signal, irrespective of any amplitude modulations and/or offsets within the signal comprising the steps of
   storing a template of length N incorporating a replica of the signal [s(n)] without multipath; and
   receiving the signal [s(n)] subject to modulation effects A on pulse shape or peak [p(n)] and vertical offset B where "n" is representative of a time index or samples of the signal;
   correlating the template with the received signal or multiple sample shifts to create a modulation-compensated received signal to estimate modulation effects of A at a particular time, n;
   subtracting various sample-shifted versions of the template from the modulation-compensated received signal to produce a corrected modulation-compensated received signal;
   calculating the average difference between the template and the corrected modulation-compensated received signal to determine the magnitude of the offset B for a particular time, n; and
   determining the squared error between the template, modified by the determined magnitude of the offset B, and the corrected modulation-compensated received signal, assuming the minimum error to correspond to the correct position of the predetermined shape within the signal.

2. The method of claim 1 further comprising:
   normalizing the template and generating either an extended template (antisymmetric concatenation) or a balanced template (DC-shifting), the integral (analog) or sum (discrete) of which is precisely equal to zero.

3. The method according to claim 2 wherein the communication system is compliant with IEEE standard 802.11.

4. The method according to claim 1 further comprising:
   removing or minimizing any signal offsets or modulations present in the received signal prior to position estimation using either digital or analog signal processing.

5. The method according to claim 1 further comprising:
   pulse shaping the signal to diminish the effects of any amplitude offset and/or modulation.

6. The method according to claim 2 further comprising received multipath estimation/profiling to determine any amplitude offset and/or modulations.

7. The method according to claim 2 further comprising:
   transmit channel estimating to determine the amplitude offset and/or modulations.

8. The method according to claim 2 further comprising:
   shifting the extended template along the received signal to estimate modulation effects of A at a particular time.

9. A method of detecting the time of arrival of received data in a wireless communication system using analog or digital analysis, irrespective of any amplitude modulations and/or DC offsets in the received signal, comprising the steps of:
   storing a template of length N incorporating a replica of the transmitted signal [s(n)] without multipath;
   normalizing the template and generating either an extended template (antisymmetric concatenation) or a balanced template (DC-shifting), the integral (analog) or sum (discrete) of which is precisely equal to zero;
   receiving the modulated signal [s(n)] subject to modulation effects A on pulse shape or peak [p(n)] and vertical offset B due to multipath where "n" is representative of a time index or samples of the signal;
   correlating the extended or balanced template with the received signal for multiple sample shifts to create a modulation-compensated received signal to estimate modulation effects of A at a particular time, n;
   subtracting various sample-shifted versions of the normalized template from the modulation-compensated received signal to produce a corrected modulation-compensated received signal;
   calculating the average difference between the normalized template and the corrected modulation-compensated received signal to determine the magnitude of the offset B for a particular time, n; and
   determining the squared error between the normalized template, modified by the determined magnitude of the offset B, and the corrected modulation-compensated received signal, assuming the minimum error to correspond to the correct time of arrival for the received data.

10. The method according to claim 9 further comprising:
    basing the extended or balanced template on receiver correlation outputs rather than the received signals.

11. A medium, executable in a computer system, for detecting a position in time of a predetermined shape within an analog or digital signal, irrespective of any amplitude modulations and/or offsets within the signal comprising:
    program instructions for storing a template of length N incorporating a replica of a signal [s(n)] without multipath;
    program instructions for normalizing the template and generating either an extended template or a balanced template;
    program instructions for receiving a modulated signal [s(n)] subject to modulation effects A on pulse shape or peak [p(n)] and vertical offset B where "n" is representative of a time index or samples of the signal; and
    program instructions for correlating the extended template with the received signal for multiple sample shifts to create a modulation-compensated received signal to estimate modulation effects of A at a particular time, n;
    program instructions for subtracting various sample-shifted versions of the normalized template from the modulation-compensated received signal to produce a corrected modulation-compensated received signal;
    program instructions for calculating the average difference between the normalized template and the corrected modulation-compensated received signal to determine the magnitude of the offset B for a particular time, n; and
    program instructions for determining the squared error between the normalized template, modified by the determined magnitude of the offset B, and the corrected modulation-compensated received signal, assuming the minimum error to correspond to the correct position of the predetermined shape within the signal.

12. The medium of claim 11 further comprising:
    program instructions for conducting real-time location tracking in the IEEE 802.11 local-area-network signal environment.

13. A system for detecting the position in time of a predetermined shape within an analog or digital signal, irrespective of any amplitude modulations and/or offsets within the signal, comprising:

at least one processor;

at least one memory coupled to the at least one processor and containing instructions which when executed by the processor cause the at least one processor to perform the steps of:

storing a template of length N incorporating a replica of the transmitted signal [s(n)] without multipath;

normalizing the template and generating either an extended template (antisymmetric concatenation) or a balanced template (DC-shifting), the integral (analog) or sum (discrete) of which is precisely equal to zero;

receiving the modulated signal [s(n)] subject to modulation effects A on pulse shape or peak [p(n)] and vertical offset B due to multipath where "n" is representative of a time index or samples of the signal;

correlating the extended or balanced template with the received signal for multiple sample shifts to create a modulation-compensated received signal to estimate modulation effects of A at a particular time, n;

subtracting various sample-shifted versions of the normalized template from the modulation-compensated received signal to produce a corrected modulation-compensated received signal;

calculating the average difference between the normalized template and the corrected modulation-compensated received signal to determine the magnitude of the offset B for a particular time, n; and determining the squared error between the normalized template, modified by the determined magnitude of the offset B, and the corrected modulation-compensated received signal, assuming the minimum error to correspond to the correct time of arrival for the received data.

* * * * *